United States Patent
Hung et al.

(10) Patent No.: US 6,610,790 B2
(45) Date of Patent: Aug. 26, 2003

(54) FLUOROELASTOMER COMPOSITION HAVING EXCELLENT PROCESSABILITY

(75) Inventors: Ming-Hong Hung, Wilmington, DE (US); Walter Werner Schmiegel, Wilmington, DE (US)

(73) Assignee: Dupont Dow Elastomers L.L.C., Wilmington, DE (US)

( * ) Notice: Subject to any disclaimer, the term of this patent is extended or adjusted under 35 U.S.C. 154(b) by 218 days.

(21) Appl. No.: 09/815,067

(22) Filed: Mar. 22, 2001

(65) Prior Publication Data

US 2002/0002248 A1 Jan. 3, 2002

Related U.S. Application Data

(60) Provisional application No. 60/198,353, filed on Apr. 19, 2000.

(51) Int. Cl.$^7$ .................................................. C08F 8/00
(52) U.S. Cl. ................... 525/326.3; 525/372; 525/384; 524/430
(58) Field of Search ................. 525/372, 384, 525/326.3; 524/430

(56) References Cited

U.S. PATENT DOCUMENTS

| | | | | |
|---|---|---|---|---|
| 3,106,589 A | * | 10/1963 | Hauptschein et al. | 570/136 |
| 4,694,045 A | * | 9/1987 | Moore | 525/276 |
| 4,758,618 A | * | 7/1988 | Ito et al. | 524/430 |
| 4,882,390 A | * | 11/1989 | Kolb | 525/326.3 |
| 5,214,106 A | | 5/1993 | Carlson et al. | |
| 5,231,154 A | * | 7/1993 | Hung | 526/206 |
| 5,260,393 A | | 11/1993 | Arcella et al. | |
| 5,696,216 A | | 12/1997 | Kruger et al. | |

FOREIGN PATENT DOCUMENTS

| | | | |
|---|---|---|---|
| EP | 0731162 | | 9/1996 |
| EP | 0905177 | | 3/1999 |
| EP | 0905177 A1 | * | 3/1999 |
| GB | 1296084 | | 11/1972 |
| WO | WO 00/11050 | | 3/2000 |

* cited by examiner

Primary Examiner—David W. Wu
Assistant Examiner—Henry S Hu

(57) ABSTRACT

Fluoroelastomers which contain copolymerized units of a fluoroolefin cure site monomer of the general formula:

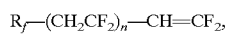

$$R_f\text{---}(CH_2CF_2)_n\text{---}CH=CF_2,$$

wherein $R_f$ is a $C_1$–$C_6$ perfluoroalkyl group or a $C_1$–$C_6$ perfluoroalkoxy group and n is an integer from 1–3, exhibit excellent physical properties and processability when cured with polyhydroxy compounds.

7 Claims, No Drawings

FLUOROELASTOMER COMPOSITION HAVING EXCELLENT PROCESSABILITY

CROSS-REFERENCE TO RELATED APPLICATIONS

This application claims the benefit of U.S. Provisional Application No. 60/198,353 filed Apr. 19, 2000.

FIELD OF THE INVENTION

This invention relates to fluoroelastomers that are capable of being crosslinked with polyhydroxy compounds to produce cured compositions having excellent processability, low temperature properties and resistance to bases.

BACKGROUND OF THE INVENTION

Elastomeric fluoropolymers (i.e. fluoroelastomers) exhibit excellent resistance to the effects of heat, weather, oil, solvents and chemicals. Such materials are commercially available and are most commonly either dipolymers of vinylidene fluoride ($VF_2$) with hexafluoropropylene (HFP) or terpolymers of $VF_2$, HFP, and tetrafluoroethylene (TFE). While these di- and terpolymers have many desirable properties, including low compression set and excellent processability, their low temperature flexibility is not adequate for all applications.

It is known that incorporation of perfluorinated vinyl ether monomer units into vinylidene fluoride elastomers improves low temperature properties. For example, Carlson, in U.S. Pat. No. 5,214,106 discloses that when perfluoro(methyl vinyl) ether (PMVE) is substituted for HFP, the resultant $VF_2$/PMVE/TFE copolymers have glass transition temperature ($T_g$) values which are 10°–20° C. lower than those of the corresponding $VF_2$/HFP/TFE copolymers. $T_g$ is often used as an indicator of low temperature flexibility because polymers having low glass transition temperatures maintain elastomeric properties at low temperatures.

Kruger, in U.S. Pat. No. 5,696,216, discloses PMVE-containing fluoroelastomers that are similar to those disclosed by Carlson. Those disclosed by Kruger contain copolymerized units of $VF_2$, TFE, at least one fluorinated propene and or fluorinated methyl vinyl ether, at least one perfluoro(polyoxyalkyl vinyl) ether, and a crosslinking site.

The compositions of Carlson and Kruger are most effectively crosslinked through use of peroxide cure systems. However, when compression molding equipment is used with peroxide curable $VF_2$/PMVE copolymers the compositions generally exhibit a tendency to stick to and foul the mold.

Tetrapolymers of $VF_2$, HFP, TFE and perfluoro(vinyl ethers) (PVE) other than PMVE are also known to exhibit improved low temperature properties compared to terpolymers of $VF_2$, HFP and TFE. For example, Arcella, et al. in U.S. Pat. No. 5,260,393 disclose a tetrapolymer comprising copolymerized units of 48–65 wt. % $VF_2$, 21–36 wt. % HFP, 3–9 wt. % PVE, and 0–17 wt. % TFE. The compositions can be cured using a bisphenol curing system and do not exhibit the mold fouling problems associated with peroxide cures of $VF_2$/PMVE copolymers. Similarly, British Patent 1,296,084 discloses fluoroelastomeric tetrapolymers containing copolymerized units of 48–65 wt. % $VF_2$, 8–23 wt. % HFP, 4–15 wt. % TFE, and 17–30 wt. % PVE. Such compositions have good low temperature properties and are curable with bisphenols or amines. Although these tetrapolymers exhibit good low temperature properties, many applications require improved low temperature and processability performance.

Merely raising the PVE content while lowering the HFP content is not a solution to the problem of improving low temperature performance of $VF_2$/HFP/PVE/TFE tetrapolymers. This is because polymers wherein the level of HFP is below about 8–10 mole N, percent do not contain sufficient copolymerized monomer sequences consisting of HFP units flanked by $VF_2$ units to permit efficient crosslinking with bisphenols. As is well known in the art, efficient curing of $VF_2$/HFP-containing fluoroelastomers with a bisphenol/accelerator system is possible only when a —$CH_2$— group in the polymer backbone is flanked by two perfluorinated carbons (e.g. $CF_2CF(CF_3)CH_2CF_2CF_2$), rendering the hydrogens acidic enough to be abstracted by base. The dehydrofluorinated polymers are easily crosslinked by bisphenols. Furthermore, as discussed by W. W. Schmiegel, in *Angewandte Makromolekulare Chemie*, 76/77, 39 (1979), completely eliminating HFP to form $VF_2$/TFE/PMVE terpolymers results in formation of monomer sequences consisting of TFE/$VF_2$/TFE; TFE/$VF_2$/PMVE; PMVE/$VF_2$/PMVE; and PMVE/$VF_2$/TFE. Although such sites readily undergo elimination of HF and trifluoromethanol in the presence of base, the double bonds thus formed are not easily crosslinked by bisphenols or any other traditional crosslinking agents.

Bowers and Schmiegel (WO 00/11050) have disclosed bisphenol cures of fluoroelastomers containing units of $VF_2$, PMVE, 2-hydropentafluoropropene (2-HPFP) and, optionally, TFE. The 2-HPFP acts as a cure site monomer, causing the fluoroelastomer to react readily with bisphenol curative. However, 2-HPFP is not readily available in commercial quantities.

Fluoroelastomers which contain copolymerized units of TFE and a hydrocarbon olefin, e.g. ethylene (E) or propylene (P), are well known in the art to have better resistance to attack by bases than most other fluoroelastomers. Examples of such fluoroelastomers include TFE/P (Ito et al. U.S. Pat. No. 4,758,618; Grootaert et al. U.S. Pat. No. 4,882,390) and E/TFE/PMVE (Moore et al. U.S. Pat. No. 4,694,045). However, these polymers are relatively difficult to cure, especially with a polyhydroxy curative. For example, TFE/P polymers generally must contain about 30–35 mol % of copolymerized units of a cure site monomer such as $VF_2$ in order to render the polymers vulcanizable by a polyhydroxy curative. Unfortunately, such a high level of $VF_2$ adversely affects the resistance of the resulting fluoroelastomer to bases.

There thus exists an unfulfilled need in the art for a method of providing polyhydroxy-curable compositions of 1) copolymers of $VF_2$, TFE, and PVE that maintain optimum low temperature properties, but which exhibit low mold sticking characteristics, improved processability and are easily curable; and 2) copolymers of TFE and a hydrocarbon olefin which maintain optimum resistance to bases.

Hauptschein et al. in U.S. Pat. No. 3,106,589 disclose a novel class of fluoroolefins of the formula $R_f$—$(CH_2CF_2)_n$—$CH=CF_2$, wherein $R_f$ is a $C_1$–$C_6$ perfluoroalkyl group or a $C_1$–$C_6$ perfluoroalkoxy group and n is an integer from 1–25. Potential utilities mentioned for these fluoroolefins include intermediates for the preparation of fluorinated carboxylic acids, nitroalcohols and hydroxy acids. Hauptschein also suggests that these fluoroolefins may be copolymerized with other olefins, but it is not suggested that these compounds might be utilized, in minor amount, as cure site monomers for fluoroelastomers largely comprised of other fluoromonomers.

SUMMARY OF THE INVENTION

The present invention is directed to a curable composition comprising:

A. a fluoroelastomer consisting essentially of (1) copolymerized units of 0.05–4 mole percent of a fluoroolefin of the formula $R_f$—$(CH_2CF_2)_n$—$CH$=$CF_2$, wherein $R_f$ is a $C_1$–$C_6$ perfluoroalkyl group or a $C_1$–$C_6$ perfluoroalkoxy group and n is an integer from 1–3; (2) 0–1 mole percent iodine chemically bound to fluoroelastomer chain ends; and (3) copolymerized units selected from the group consisting of
   (i) 35–85 mole percent vinylidene fluoride, 10–60 mole percent perfluoro(vinyl ether), 0–35 mole percent tetrafluoroethylene;
   (ii) 30 to 70 mole percent tetrafluoroethylene, 5–25 mole percent vinylidene fluoride and 15–55 mole percent of a hydrocarbon olefin; and
   (iii) 10 to 40 mole percent of a hydrocarbon olefin, 2 to 60 mole percent tetrafluoroethylene and 20 to 45 mole percent of a perfluoro(vinyl ether);
B. a polyhydroxy crosslinking agent;
C. a cure accelerator; and
D. a metal oxide or metal hydroxide.

DETAILED DESCRIPTION OF THE INVENTION

The fluoroelastomers utilized in the curable compositions of the present invention are copolymers capable of undergoing crosslinking reactions with polyhydroxylic compounds to form cured elastomeric compositions that exhibit either unusually good low temperature properties or unusually good resistance to attack by base.

All the fluoroelastomers used in this invention contain copolymerized units of a certain fluoroolefin (FO1) cure site monomer which is of the general formula

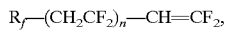
$R_f$—$(CH_2CF_2)_n$—$CH$=$CF_2$, wherein $R_f$ is a $C_1$–$C_6$ perfluoroalkyl group or a $C_1$–$C_6$ perfluoroalkoxy group and n is an integer from 1–3. Specific examples of such fluoroolefins include, but are not limited to 1,1,3,3,5,5,6,6,7,7,8,8,8-tridecafluoro-1-octene ($C_4F_9$—$CH_2CF_2$—$CH$=$CF_2$); 1,1,3,3,5,5,6,6,6-nonafluoro-1-hexene ($C_2F_5$—$CH_2CF_2$—$CH$=$CF_2$); and 1,1,3,3,5,5,6,6,7,7,8,8,9,9,10,10,10-heptadecafluoro-1-decene ($C_6F_{13}$—$CH_2CF_2$—$CH$=$CF_2$).

A particular characteristic of the FO1 monomer is that it acts as an independent cure site that takes part in crosslinking reactions with polyhydroxylic curing agents. Reaction of fluoroelastomer with curing agent takes place on the side chain of copolymerized units of FO1, rather than on the main polymer chain. Polymers that contain copolymerized FO1 monomer units do not require the presence of copolymerized monomer sequences of vinylidene fluoride ($VF_2$) flanked by perfluoromonomers such as hexafluoropropylene (HFP) (e.g. HFP/$VF_2$/HFP unit sequences) for initiation of dehydrofluorination. Introduction of copolymerized FO1 units into the $VF_2$/HFP copolymer chain creates side chain sites that exceed the reactivity of HFP/$VF_2$/HFP sequences.

Because of the ease of hydrogen abstraction in FO1-containing fluoroelastomers, the polymers of the present invention require only low levels of FO1, i.e. 0.05–4 mol %, based on the total moles of copolymerized monomer units in the fluoroelastomer, to promote efficient polyhydroxylic cures. This permits adjustment of other comonomer levels to maximize particular physical properties. Thus, the polymers of the present invention exhibit excellent cure characteristics with only low levels of FO1. They exhibit a combination of excellent processability and either low temperature properties or base resistance not found in prior art fluoroelastomers. Preferably levels of FO1 will be between 0.1–2.5 mol %.

The fluoroolefin cure site monomers described above may be prepared by a 2-step process wherein vinylidene fluoride is first reacted with an iodide of formula $R_f I$ (wherein $R_f$ is as defined above) to form a fluorinated alkyl iodide. The latter is then dehydroiodinated to yield the desired fluoroolefin cure site monomer. See for example U.S. Pat. No. 3,106,589.

In addition to the cure site monomer, the fluoroelastomer copolymers employed in the compositions of this invention may contain up to about 1 mole percent iodine chemically bound to polymer chain ends, the iodine being introduced via use of an iodine-containing chain transfer agent during polymerization.

In addition to cure site monomer FO1 and, optional iodine, the fluoroelastomers used in this invention contain copolymerized units of other monomers such as fluoroolefins, fluorovinyl ethers, hydrocarbon olefins and vinyl ethers.

A preferred fluoroelastomer contains, in addition to FO1, and optional iodine, copolymerized units of between 35–85 (preferably 50–75) mole percent $VF_2$, based on the total moles of copolymerized monomer units in the fluoroelastomer, 10–60 (preferably 12–30) mole percent perfluoro(vinyl ether) and 0–35 (preferably 3.5–35) mole percent TFE. If less than 35 mol % $VF_2$ units are present, the polymerization rate is very slow. In addition, good low temperature flexibility cannot be achieved. Vinylidene fluoride levels above 85 mol % result in polymers that contain crystalline domains and are characterized by poor low temperature compression set resistance and reduced fluids resistance. If less than 10 mol % perfluoro(vinyl ether) is present, the low temperature properties of the fluoroelastomers are adversely affected. The presence of copolymerized units of TFE is desirable for the purpose of increasing fluorine content without unduly compromising low temperature flexibility. High fluorine content promotes good fluid resistance. If TFE is present as a comonomer, it is preferably copolymerized in amounts of at least 3.5 mol %. Levels of 3.5 mol % or greater TFE lead to improved fluid resistance in some end use applications. TFE levels above 35 mol % result in some polymer crystallinity which affects low temperature compression set and flexibility.

Another preferred fluoroelastomer contains, in addition to FO1, and optional iodine, copolymerized units of between 30 to 70 mole percent tetrafluoroethylene, 5–25 mole percent vinylidene fluoride and 15 to 55 mole percent of a hydrocarbon olefin.

A third preferred fluoroelastomer contains, in addition to FO1, and optional iodine, copolymerized units of between 10 to 40 (preferably 20–40) mole percent of a hydrocarbon olefin, 32 to 60 mole percent tetrafluoroethylene and 20 to 45 (preferably 20–35) mole percent of a perfluoro(vinyl ether).

The fluoroelastomers employed in this invention may also contain minor amounts of copolymerized units of one or more other monomers, with the proviso that the additional monomer does not affect the basic and novel characteristics of the polymer. Such other monomers may include, for example, vinyl fluoride, trifluoroethylene, trifluoropropene, chlorotrifluoroethylene, alkyl vinyl ethers, vinyl acetate, vinyl chloride, ethylene, and propylene, generally in quantities of up to about 10 mol %, based on the total moles of copolymerized monomer units in the fluoroelastomer.

Perfluoro(vinyl ethers) (PVE) suitable for use as comonomers include those of the formula:

$$CF_2=CFO(R_fO)_n(R_fO)_mR_f \qquad (I)$$

where $R_f$ and $R_{f'}$ are different linear or branched perfluoroalkylene groups of 2–6 carbon atoms, m and n are independently 0–10, and $R_f$ is a perfluoroalkyl group of 1–6 carbon atoms.

A preferred class of PVE includes compositions of the formula:

$$CF_2=CFO(CF_2CFXO)_nR_f \qquad (II)$$

where X is F or $CF_3$, n is 0–5, and $R_f$ is a perfluoroalkyl group of 1–6 carbon atoms.

A most preferred class of PVE includes those ethers wherein n is 0 or 1 and $R_f$ contains 1–3 carbon atoms. Examples of such perfluorinated ethers include perfluoro(methyl vinyl ether) and perfluoro(propyl vinyl ether). Other useful monomers include compounds of the formula:

$$CF_2=CFO[(CF_2)_mCF_2CFZO]_nR_f \qquad (III)$$

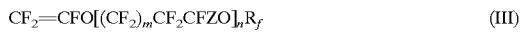

where $R_f$ is a perfluoroalkyl group having 1–6 carbon atoms, m=0 or 1, n=0–5, and Z=F or $CF_3$.

Preferred members of this class are those in which $R_f$ is $C_3F_7$, m=0, and n=1.

Additional perfluoro(vinyl) ether monomers include compounds of the formula:

$$CF_2=CFO[(CF_2CFCF_3O)_n(CF_2CF_2CF_2O)_m(CF_2)_p]C_xF_{2x+1} \qquad (IV)$$

where m and n independently=1–10, p=0–3, and x=1–5.

Preferred members of this class include compounds where n=0–1, m 0–1, and x=1.

Examples of other useful perfluoro(vinyl ethers) include:

$$CF_2=CFOCF_2CF(CF_3)O(CF_2O)_mC_nF_{2n+1} \qquad (V)$$

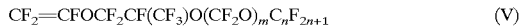

where n=1–5, m=1–3, and where, preferably, n=1.

Mixtures of the above perfluoro(vinyl ethers) may also be used.

By "hydrocarbon olefin" is meant a $C_2$–$C_5$ olefins containing no C—F bonds. Examples of such olefins include, but are not limited to ethylene (E), propylene (P), butylene-1 (B), and isobutylene (iB).

Specific examples of fluoroelastomers useful in this invention include, but are not limited to those having copolymerized units of $VF_2$/PMVE/TFE/FO1; $VF_2$/TFE/P/FO1; and E/TFE/PMVE/FO1.

The fluoroelastomer copolymers employed in this invention may be prepared using free radical batch or semi-batch, or continuous free radical emulsion polymerization processes. They may also be prepared by free radical suspension polymerization processes.

For example, if a continuous emulsion process is utilized, the polymers are generally prepared in a continuous stirred tank reactor. Polymerization temperatures may be in the range of 40° to 145° C., preferably 80° to 135° C. at pressures of 1 to 8 MPa. Residence times of 20 to 360 minutes are preferred. Free radical generation may be effected through use of a water-soluble initiator such as ammonium persulfate, either by thermal decomposition or by reaction with a reducing agent such as sodium sulfite. An inert surface-active agent such as ammonium perfluorooctanoate may be utilized to stabilize the dispersion, usually in conjunction with addition of a base such as sodium hydroxide or a buffer such as disodium phosphate to control pH in the range 3 to 7. Unreacted monomer is removed from the reactor effluent latex by vaporization at reduced pressure. Polymer is recovered from the stripped latex by coagulation. For example, coagulation may be effected by reducing latex pH to about 3 by addition of acid, then adding a salt solution, such as an aqueous solution of calcium nitrate, magnesium sulfate, or potassium aluminum sulfate, to the acidified latex. The polymer is separated from the serum, then washed with water and subsequently dried. After drying, the product may be cured.

Chain transfer agents may be used in the polymerization in order to control the molecular weight distribution of the resulting polymers. Examples of chain transfer agents include isopropanol; methyl ethyl ketone; ethyl acetate; diethyl malonate; isopentane; 1,3-diiodoperfluoropropane; 1,4-diiodoperfluorobutane; 1,6-diiodoperfluorohexane; 1,8-diiodoperfluorooctane; methylene iodide; trifluoromethyl iodide; perfluoro(isopropyl) iodide; and perfluoro(n-heptyl) iodide. As mentioned above, polymerization in the presence of iodine-containing chain transfer agents may result in a polymer with one or two iodine atoms per fluoroelastomer polymer chain, bound at the chain ends (see for example U.S. Pat. No. 4,243,770 and U.S. Pat. No. 4,361,678). Such polymers may have improved flow and processability compared to polymers made in the absence of a chain transfer agent. Generally, up to about 1 mole percent iodine chemically bound to fluoroelastomer chain ends will be incorporated into the polymer, preferably from 0.1–0.3 mole percent.

An embodiment of the present invention is a curable composition that comprises the above-described fluoroelastomer copolymers and a polyhydroxylic curing agent. Any of the known polyhydroxylic aromatic crosslinking agents that require accelerators for satisfactory cure rates are suitable for use with the fluoroelastomers of the present invention. The crosslinking agent is usually added in amounts of from about 0.5–4 parts by weight per hundred parts by weight fluoroelastomer (phr), usually 1–2.5 phr. Preferred crosslinking agents are di- tri-, tetrahydroxybenzenes, naphthalenes, anthracenes and bisphenols of the formula:

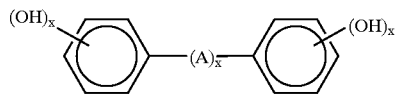

where A is a stable divalent radical, such as a difunctional aliphatic, cycloaliphatic, or aromatic radical of 1–13 carbon atoms, or a thio, oxy, carbonyl, sulfinyl, or sulfonyl radical; A is optionally substituted with at least one chlorine or fluorine atom; x is 0 or 1; n is 1 or 2 and any aromatic ring of the polyhydroxylic compound is optionally substituted with at least one atom of chlorine, fluorine, or bromine, a —CHO group, or a carboxyl or acyl radical (e.g. a —COR where R is OH or a $C_1$–$C_8$ alkyl, aryl, or cycloalkyl group). It will be understood from the above formula describing bisphenols that the —OH groups can be attached in any position (other than number one) in either ring. Blends of two or more such compounds can also be used.

Referring to the bisphenol formula shown in the previous paragraph, when A is alkylene, it can be, for example, methylene, ethylene, chloroethylene, fluoroethylene, difluoroethylene, 1,3-propylene, 1,2-propylene, tetramethylene, chlorotetramethylene, fluorotetramethylene, trifluorotetramethylene, 2-methyl-1,3-propylene, 2-methyl-1,2-propylene, pentamethylene, and hexamethylene. When A is alkylidene, it can be for example ethylidene, dichloroethylidene, difluoroethylidene, propylidene, isopropylidene, trifluoroisopropylidene, hexafluoroisopropylidene, butylidene, heptachlorobutylidene, heptafluorobutylidene, pentylidene, hexylidene, and 1,1-cyclohexylidene. When A is a cycloalkylene radical, it can be for example 1,4- cyclohexylene, 2-chloro-1,4-cyclohexylene, 2-fluoro-1,4-cyclohexylene, 1,3-cyclohexylene, cyclopentylene, chlorocyclopentylene, fluorocyclopentylene, and cycloheptylene. Further, A can be an arylene radical such as m-phenylene, p-phenylene, 2-chloro-1,4-phenylene, 2-fluoro-1,4-phenylene, o-phenylene, methylphenylene, dimethylphenylene, trimethylphenylene, tetramethylphenylene, 1,4-naphthylene, 3-fluoro-1,4-naphthylene, 5-chloro-1,4-naphthylene, 1,5-naphthylene, and 2,6-naphthylene. Bisphenol AF [4,4'-(hexafluoroisopropylidene)diphenol] is a preferred crosslinking agent.

Other useful crosslinking agents include hydroquinone, dihydroxybenzenes such as catechol, resorcinol, 2-methyl resorcinol, 5-methyl resorcinol, 2-methyl hydroquinone, 2,5-dimethyl hydroquinone; 2-t-butyl hydroquinone; and 1,5-dihydroxynaphthalene.

Additional polyhydroxy curing agents include alkali metal salts of bisphenol anions, quaternary ammonium salts of bisphenol anions and quaternary phosphonium salts of bisphenol anions. For example, the salts of bisphenol A and bisphenol AF. Specific examples include the disodium salt of bisphenol AF, the dipotassium salt of bisphenol AF, the monosodium monopotassium salt of bisphenol AF and the benzyltriphenylphosphonium salt of bisphenol AF. Quaternary ammonium and phosphonium salts of bisphenol anions and their preparation are discussed in U.S. Pat. Nos. 4,957,975 and 5,648,429.

In addition, derivatized polyhydroxy compounds, such as trimethylsilyl ethers and diesters, are useful crosslinking agents. Examples of such compositions include diesters of phenols, such as the diacetate of bisphenol AF, the diacetate of sulfonyl diphenol, and the diacetate of hydroquinone.

When cured with polyhydroxy compounds, the curable compositions will also generally include a cure accelerator. The most useful accelerators are quaternary phosphonium salts, quaternary alkylammonium salts, or tertiary sulfonium salts. Particularly preferred accelerators are n-tetrabutylammonium hydrogen sulfate, tributylallylphosphonium chloride and benzyltriphenylphosphonium chloride. Other useful accelerators include those described in U.S. Pat. Nos. 5,591,804; 4,912,171; 4,882,390; 4,259,463 and 4,250,278 such as tributylbenzylammonium chloride, tetrabutylammonium bromide, tetrabutylammonium chloride, benzyl tris(dimethylamino)phosphonium chloride; 8-benzyl-1,8-diazabicyclo[5,4,0]-7-undecenonium chloride, $[(C_6H_5)_2S^+(C_6H_{13})][Cl]^-$, and $[(C_6H_{13})_2S(C_6H_5)]^+$ $[CH_3CO_2]^-$. In general, about 0.2 phr accelerator is an effective amount, and preferably about 0.35–1.5 phr is used.

If quaternary ammonium or phosphonium salts of bisphenols are used as curing agents, then addition of a cure accelerator is not necessary.

The polyhydroxy cure system will also contain a metal compound composed of a divalent metal oxide, such as magnesium oxide, zinc oxide, calcium oxide, or lead oxide, or a divalent metal hydroxide; or a mixture of the oxide and/or hydroxide with a metal salt of a weak acid, for example a mixture containing about 1–70 percent by weight of the metal salt. Among the useful metal salts of weak acids are barium, sodium, potassium, lead, and calcium stearates, benzoates, carbonates, oxalates, and phosphites. The amount of the metal compound added is generally about 1–15 phr, about 2–10 parts being preferred.

Other additives may be compounded into the fluoroelastomer to optimize various physical properties. Such additives include carbon black, stabilizers, plasticizers, lubricants, pigments, fillers, and processing aids typically utilized in perfluoroelastomer compounding. Any of these additives can be incorporated into the compositions of the present invention, provided the additive has adequate stability for the intended service conditions.

Carbon black is used in elastomers as a means to balance modulus, tensile strength, elongation, hardness, abrasion resistance, conductivity, and processability of the compositions. Carbon black is generally useful in amounts of from 5–60 phr.

In addition, or in the alternative, fluoropolymer fillers may be present in the composition. Generally from 1 to 50 phr of a fluoropolymer filler is used, and preferably at least about 5 phr is present. The fluoropolymer filler can be any finely divided, easily dispersed plastic fluoropolymer that is solid at the highest temperature utilized in fabrication and curing of the perfluoroelastomer composition. By solid, it is meant that the fluoroplastic, if partially crystalline, will have a crystalline melting temperature above the processing temperature(s) of the perfluoroelastomer(s). Such finely divided, easily dispersed fluoroplastics are commonly called micropowders or fluoroadditives. Micropowders are ordinarily partially crystalline polymers.

A preferred additive class includes molecular sieves, particularly zeolites. Molecular sieve zeolites are crystalline aluminosilicates of Group IA and Group IIA elements, such as sodium, potassium, magnesium, and calcium. Chemically, they are represented by the empirical formula: $M_{2/n}O.Al_2O_3 \cdot ySiO_2 \cdot wH_2O$ where y is 2 or greater, n is the cation valence, and w represents the water contained in the voids of the zeolite. Commercially available examples of such compositions include Molecular Sieve 3A, Molecular Sieve 4A, Molecular Sieve 5A, and Molecular Sieve 13X, all available from Aldrich Chemical Co., Inc. Milwaukee, Wis. Use of this class of additives prevents sponging and improves heat aging of vulcanizates upon press curing in many instances. In general, use of about 1–5 phr is sufficient.

Other preferred additives include modified silane coated mineral fillers. By "modified silane" is meant that the silane contains at least one reactive functional group such as an amino group, or an epoxy group. The mineral fillers used in this invention are preferably somewhat alkaline, such as calcium metasilicates ($CaSiO_3$), especially wollastonite. Wollastonite coated with either an aminosilane or an epoxysilane is especially preferred. These compounds are commercially available from Quarzwerke GmbH of Freschen, Germany as Tremin®283 EST (epoxysilane treated wollastonite) and Tremin®283 AST (aminosilane treated wollastonite). These modified silane coated mineral fillers prevent sponging of the fluoroelastomer composition during press cure and also accelerate the cure rate. Generally, about 5 to 80 phr modified silane coated mineral filler is useful in the compositions of this invention, about 10 to 60 phr being preferred.

The crosslinking agent, accelerator, metal oxide, and other additives are generally incorporated into the polymer by means of an internal mixer or on a rubber mill. The resultant composition is then cured, generally by means of heat and pressure, for example by compression transfer or injection molding.

The curable compositions of the present invention are useful in production of gaskets, tubing, seals and other molded components. Such articles are generally produced by molding a compounded formulation of the curable composition with various additives under pressure, curing the part, and then subjecting it to a post cure cycle. The cured compositions have excellent low temperature flexibility and processability as well as excellent thermal stability and chemical resistance. They are particularly useful in applications such as seals and gaskets requiring a good combination of oil resistance, fuel resistance and low temperature flexibility, for example in fuel injection systems, fuel line connector systems and in other seals for high and low temperature automotive uses.

The invention is now illustrated by certain embodiments wherein all parts and percentages are by weight unless otherwise specified.

EXAMPLES

Test Methods
Cure Characteristics

Unless otherwise noted, cure characteristics were measured using an Alpha Technologies Ltd. 2000E moving disk rheometer (MDR), under conditions corresponding to ISO 6502 at a moving die frequency of 1.66 Hz, oscillation amplitude of ±0.5°, temperature of 180° C., sample size of 7–8 g, and the duration of the test was 12 minutes. The following cure parameters were recorded:

$M_H$: maximum torque level, in units of dN·m $M_L$: minimum torque level, in units of dN·m Delta M: difference between maximum and minimum torque, in units of d·Nm $t_s2$: minutes to a 2.26 dNm rise above $M_L$ tc50: minutes to 50% of maximum torque tc90: minutes to 90% of maximum torque Fluoroolefin A (1,1,3,3,5,5,6,6,7,7,8,8,8-tridecafluoro-1-octene [$C_4F_9$—$CH_2CF_2$—CH=$CF_2$]) was prepared in the following manner.

In a 1300 ml stainless steel shaker tube was charged perfluorobutyl iodide (346 g, 1.0 mol) and vinylidene fluoride (86.4 g, 1.35 mol). The tube was sealed and then agitated at 230° C. for 15 hours. After cooling, the product from three tubes was distilled and separated into three fractions. The first fraction had a boiling point of 41–42° C. at a pressure of 40 mm Hg. This fraction was highly pure 1-iodo-1,1,3,3,4,4,5,5,6,6,6-undecafluorohexane [$C_4F_9$—$CH_2CF_2$—I] (525 g). The second fraction had a boiling point of 48–50° C. at 25 mm Hg and was identified as a mixture of $C_4F_9$—$CH_2CF_2$—I and $C_4F_9$—$CH_2CF_2$—$CH_2CF_2$—I (105 g) (mole ratio 2:1). The third fraction had a boiling point of 74–82° C. at 25 mm Hg. This fraction was highly pure 1-iodo-1,1,3,3,5,5,6,6,7,7,8,8,8-tridecafluorooctane [$C_4F_9CH_2CF_2CH_2CF_2$—I] (450 g). There were higher oliogmeric residual products ($C_4F_9$—($CH_2CF_2$)$_n$—I, wherein n is 3 or greater) left in the pot without isolation.

The $C_4F_9$—$CH_2CF_2$—$CH_2CF_2$—I compound had the following NMR spectra: $^1$H-NMR (400 MHz, CDCl$_3$): δ3.40 (m, 2H), 2.82 (m, 2H); and $^{19}$F-NMR: (376.89 MHz, CDCl$_3$): −81.5 (m, 3F), −88.6 (m, 2F), −113.0 (m, 2F), −124.7 (s, 2F), −126.3 (m, 2F), −39.2 (m, 2F, —$CF_2$I).

A round-bottomed flask was charged with a mixture of $C_4F_9$—$CH_2CF_2$—$CH_2CF_2$—I (180 g, 0.38 mol) and lithium chloride (23.9 g, 0.56 mol) in anhydrous N,N-dimethylformamide (DMF, 160 ml) solvent. The mixture flask was vigorously stirred throughout the reaction. A vacuum was applied (220–240 mm Hg) and the mixture was slowly heated up to 140° C. over the course of 1–2 hrs. A volatile component was distilled off during this heating period. It was collected in a cold trap. Redistillation afforded the desired 1,1,3,3,5,5,6,6,7,7,8,8,8-tridecafluoro-1-octene [$C_4F_9$—$CH_2CF_2$—CH=$CF_2$] product as a clear colorless liquid having a boiling point 80–82° C. at 230 mm Hg. The yield was 86 grams (65.4%).

NMR spectral information for the product follows: $^1$H-NMR (400 MHz, CDCl$_3$): δ4.78 (m, 1H), 2.87 (m, 2H); $^{19}$F-NMR: (376.89 MHz, CDCl$_3$): −74.4 (m, 1F), −78.1 (m, 1F), −81.6 (m, 3F), −84.6 (m, 2F), −113.5 (s, br, 2F), −125.0 (s, br, 2F), −126.3 (m, 2F); IR: 1775 cm$^{-1}$ (neat).

Fluoroolefin B (1,1,3,3,5,5,6,6,6-nonafluoro-1-hexene [$C_2F_5$—$CH_2CF_2$—CH=$CF_2$]) was prepared in the following manner.

A stainless steel shaker tube was charged with pentafluoroethyl iodide (210 g, 0.85 mol) and vinylidene fluoride (55 g, 0.86 mol). The tube was sealed and then agitated at 200° C. for 35 hours. After cooling, the product from two such tubes was distilled and separated into two fractions. Material which collected in a cold trap during the distillation had a boiling point of 13° C. (125 g) and was identified as unreacted pentafluoroethyl iodide. The first product fraction that was collected had a boiling point range of 73–74° C. at a pressure of 760 mm Hg. It was identified as highly pure 1-iodo-1,1,3,3,4,4,4-heptafluorobutane [$C_2F_5$—$CH_2CF_2$—I] (145 g, 38% yield based on recovered starting material). The second fraction had a boiling point of 78–79° C. at 75 mm Hg and was mainly $C_2F_5$—$CH_2CF_2$—$CH_2CF_2$—I (116 g, 26% yield based on recovered starting material). There were also higher oligomeric residual products ($C_2F_5$—($CH_2CF_2$)$_n$—I, wherein n is at least 3) left in the distillation pot.

The NMR spectra of $C_2F_5$—$CH_2CF_2$—$CH_2CF_2$—I was as follows: $^1$H-NMR (400 MHz, CDCl$_3$): δ3.39 (quintet, J=15.4 Hz, 2H), 2.79 (m, 2H); $^{19}$F-NMR: (376.89 MHz, CDCl$_3$): −86.7 (s, 3F), −89.0 (m, 2F), −116.7(m, 2F), −39.2 (m, 2F, —$CF_2$I).

A round-bottomed flask was charged with a mixture of 1-iodo-1,1,3,3,5,5,6,6,6-nonafluorohexane [$C_2F_5$—$CH_2CF_2$—$CH_2CF_2$—I] (97 g, 0.26 mol) and lithium chloride (16 g, 0.376 mol) in anhydrous N,N-dimethylformamide (DMF, 120 ml) solvent. The mixture was vigorously stirred throughout the reaction. A vacuum was applied (210–220 mm Hg) and the mixture was then slowly heated up to 125° C. over a period of 1–2 hours. The volatile component which was distilled off during this heating period was collected in a cold trap. Re-distillation afforded the 1,1,3,3,5,5,6,6,6-nonafluoro-1-hexene [$C_2F_5$—$CH_2CF_2$—CH=$CF_2$] product as a clear colorless liquid having a boiling point 72–74° C. (at a pressure of 760 mm Hg) and a yield of 36 grams (56%).

The NMR spectra of the product follow: $^1$H-NMR (400 MHz, CDCl$_3$): δ4.77 (m, 1H), 2.84 (m, 2H); $^{19}$F-NMR: (376.89 MHz, CDCl$_3$): −74.3 (m, 1F), −78.0 (m, 1F), −84.9 (m, 2F), −86.7 (s, br, 3F), −117.2 (m, 2F); IR: 1775 cm$^{-1}$ (neat).

Polymer A (containing copolymerized units of VF$_2$/PMVE/TFE/$C_4F_9$—$CH_2CF_2$—CH=$CF_2$) was prepared in the following manner.

A 4-liter polymerization reactor was charged with de-ionized water (2000 ml), disodium phosphate heptahydrate (15 g), ammonium perfluorooctanoate (3.9 g), and 1,1,3,3,5,5,6,6,7,7,8,8,8-tridecafluoro-1-octene monomer (19 g). The reactor was sealed. Oxygen was removed from the reactor by evacuating it and then purging with nitrogen gas. The latter process was repeated three times. The reactor was then charged with a monomer gas mixture of TFE (10 g/hr), VF$_2$ (320 g/hr) and PMVE (670 g/hr) until the pressure reached 200 psi (1.38 MPa). The temperature of the reactor contents was set to 80° C. and the contents were stirred by a mechanical stirrer at 200 rpm. A solution of ammonium persulfate initiator (2.0 wt. % in water, 18 ml) was then added to the reactor. When a pressure drop (due to consumption of monomers in the polymerization reaction) was observed, the monomer gas feed was switched to a mixture of TFE (36 g/hr), VF$_2$ (216 g/hr) and PMVE (140 g/hr). The gaseous monomer flow rate was then controlled so as to maintain a reactor pressure of 200 psi (1.38 MPa) as ammonium persulfate aqueous solution (2.0 wt. %) was co-fed to the reactor at a rate of 0.2 ml/min. The polymerization was terminated after a total of 709 grams of gaseous monomer had been fed into the reactor. The resulting fluoroelastomer latex was removed from the reactor and then the polymer was coagulated by addition of a solution of magnesium sulfate. Coagulated polymer was collected by filtration, washed thoroughly with warm (70° C.) de-ionized water, and then dried in an air oven at 80° C. This fluoroelastomer polymer had a T$_g$ of –28.8° C., as determined by differential scanning calorimetry (DSC). The composition of the polymer was analyzed by infrared spectroscopy and $^{19}$F-NMR (in hexafluorobenzene at 80° C.) and was determined to be 75.62 mol % VF$_2$, 5.48 mol % TFE, 18.47 mol % PMVE and 0.438 mol % C$_4$F$_9$—CH$_2$CF$_2$—CH=CF$_2$. This is equivalent to 56.24 wt. % VF$_2$, 6.37 wt. % TFE, 35.63 wt. % PMVE and 1.76 wt. % C$_4$F$_9$—CH$_2$CF$_2$—CH=CF$_2$, Polymer B (containing copolymerized units of VF$_2$/PMVE/TFE/C$_2$F$_5$—CH$_2$CF$_2$—CH=CF$_2$) was prepared in the following manner.

A 4-liter polymerization reactor was charged with de-ionized water (2000 ml), disodium phosphate heptahydrate (18 g), ammonium perfluorooctanoate (3.9 g), and 1,1,3,3,5,5,6,6,6-nonafluoro-1-hexene monomer (25 g). The reactor was sealed. Oxygen was removed from the reactor by three cycles of evacuation, followed by a nitrogen purge. The reactor was then charged with a monomer gas mixture of TFE (15 g/hr), VF$_2$ (300 g/hr) and PMVE (670 g/hr) until the pressure reached 190 psi (1.31 MPa). The reactor contents were maintained at a temperature of 80° C. and the contents were stirred by a 200 rpm mechanical stirrer. A solution of ammonium persulfate (2.0 wt. % in water, 15 ml) initiator was then introduced into the reactor. After a pressure drop was observed, the monomer gas feed was switched to a mixture of TFE (41 g/hr), VF2 (204 g/hr) and PMVE (140 g/hr). Gas monomer feed rate was then controlled so as to maintain a constant pressure in the reactor of 190 psi (1.31 MPa) as ammonium persulfate aqueous solution (2.0 wt. %) was co-fed to the reactor at a rate of 0.2 ml/min. Polymerization was terminated after a total of 755 grams of gaseous monomer had been fed. The resulting fluoroelastomer latex was removed from the reactor and then coagulated by addition of a magnesium sulfate aqueous solution. Coagulated polymer was collected by filtration, washed thoroughly with warm (70° C.) de-ionized water, and then dried in an air oven at 80° C. This polymer had a T$_g$ of –30.14° C. The composition of the polymer was analyzed by infrared spectroscopy and $^{19}$F-NMR (in acetone-d$_6$ at ambient temperature) and was determined to be 74.56 mol % VF$_2$, 6.95 mol % TFE, 18.34 mol % PMVE and 0.143 mol % C$_2$F$_5$—CH$_2$CF$_2$—CH=CF$_2$. The latter is equivalent to 55.83 wt. % VF2, 8.13 wt. % TFE, 35.62 wt. % PMVE and 0.41 wt. % C$_2$F$_5$—CH$_2$CF$_2$—CH=CF$_2$.

Control Polymer A (containing only copolymerized units of VF$_2$/PMVE/TFE, i.e. no cure site monomer) was prepared in the following manner.

An aqueous solution, consisting of 2.77 g/hr ammonium persulfate, 0.80 g/h sodium hydroxide, and 2.25 g/hr ammonium perfluorooctanoate, in deionized water, was fed to a 2L reactor at a rate of 4 L/hr. The reactor was evacuated and purged with nitrogen as above. After 30 minutes, the reaction was initiated by introducing a gaseous monomer mixture consisting of 320.6 g/hr TFE, 389.5 g/hr VF$_2$, and 477.4 g/hr PMVE. After 1.5 hours, effluent dispersion was collected for 7 hours. The effluent polymer dispersion, when separated from residual monomers had a pH of 3.2 and contained 22.6 weight percent solids. The fluoroelastomer was isolated by coagulation as described for Polymer A. The filtered and washed polymer was dried in an air oven at approximately 50–65° C. to a moisture content of less than 1%. About 7.9 kg of polymer was recovered at an overall conversion of 98%. The polymer, composed of 27.29 wt. % TFE units, 33.30 wt. % VF$_2$ units, and 39.41 wt. % PMVE units, had an inherent viscosity of 0.88 dL/g, measured at 30° C. in methyl ethyl ketone, and a Mooney viscosity, ML-10 (121° C.) of 100.

Example 1

Samples of Polymer A, Polymer B and Control Polymer A were compounded on a two-roll rubber mill with the components shown in Table I. Cure characteristics, measured according to the Test Method described above, are also reported in Table I.

Control Polymer A, which contained no FO1 cure site monomer, exhibited essentially no cure response.

TABLE I

| Formulation | Sample 1 | Sample 2 | Sample 3 | Sample 4 | Control |
|---|---|---|---|---|---|
| Polymer A | 100 | 100 | | | |
| Polymer B | | | 100 | 100 | |
| Control Polymer A | | | | | 100 |
| Tremin ® 283 600EST[1] | 45 | 45 | 45 | 45 | |
| MT Carbon Black[2] | 2.5 | 2.5 | 2.5 | 2.5 | 10 |
| Calcium Hydroxide[3] | 6 | 6 | 6 | 3 | 2 |
| MgO[4] | 3 | 3 | 3 | 2 | 2 |
| Molecular sieve 13X | 3 | | | 3 | |
| VPA No. 2[5] | 1 | 1 | 1 | 1 | 0.5 |
| TBAHS[6] | 0.5 | 0.5 | 0.5 | 0.5 | 1 |
| Bisphenol AF[7] | 2 | 2 | 2 | 2 | 2 |
| Cure Characteristics | | | | | |
| M$_L$, dNm | 7.71 | 7.33 | 6.68 | 7.93 | — |
| M$_H$, dNm | 25.74 | 26.76 | 29.25 | 18.56 | — |
| Delta M, dNm | 18.03 | 19.43 | 22.57 | 10.63 | 0.6 |
| t$_s$2, minutes | 1.28 | 1.01 | 1.18 | 2.22 | — |
| tc50, minutes | 2.13 | 1.65 | 2.62 | 6.52 | — |
| tc90, minutes | 3.71 | 3.61 | 6.6 | 10.97 | — |

[1]Calcium meta-silicate treated with aminosilane (available from Quarzwerke GmbH, Freschen, Germany)
[2]Thermax FF N 990 medium thermal carbon black (available from Lehmann & Voss Co.)
[3]Rhenofit CF (available from Bayer)
[4]Elastomag ® 170 (available from Morton Performance Chemicals, Inc.)
[5]Rice Bran Wax (available from DuPont Dow Elastomers L.L.C.)
[6]Tetrabutylammonium hydrogen sulfate (available from DuPont Dow Elastomers L.L.C.)
[7]4,4'-(Hexafluoroisopropylidene)diphenol (available from DuPont Dow Elastomers L.L.C.)

What is claimed is:

1. A curable composition comprising
   A. a fluoroelastomer consisting essentially of (1) copolymerized units of 0.05–4 mole percent of a fluoroolefin of the formula R$_f$—(CH$_2$CF$_2$)$_n$—CH=CF$_2$, wherein R$_f$ is a C$_1$–C$_6$ perfluoroalkyl group or a C$_1$–C$_6$ perfluoroalkoxy group and n is an integer from 1–3; and (2) copolymerized units selected from the group consisting of
      (i) 35–85 mole percent vinylidene fluoride, 10–60 mole percent perfluoro(vinyl ether), 0–35 mole percent tetrafluoroethylene;

(ii) 30 to 70 mole percent tetrafluoroethylene, 5–25 mole percent vinylidene fluoride and 15–55 mole percent of a hydrocarbon olefin; and
(iii) 10 to 40 mole percent of a hydrocarbon olefin, 2 to 60 mole percent tetrafluoroethylene and 20 to 45 mole percent of a perfluoro(vinyl ether);

B. a polyhydroxy crosslinking agent;
C. a cure accelerator; and
D. a metal oxide or metal hydroxide.

2. A composition of claim 1 wherein said fluoroelastomer consists essentially of copolymerized units of 35–85 mole percent vinylidene fluoride, 10–60 mole percent perfluoro (methyl vinyl ether), 0–35 mole percent tetrafluoroethylene, and 0.05–4 mole percent of a fluoroolefin, said fluoroolefin being selected from the group consisting of 1,1,3,3,5,5,6,6,7,7,8,8,8-tridecafluoro-1-octene; 1,1,3,3,5,5,6,6,6-nonafluoro-1-hexene; and 1,1,3,3,5,5,6,6,7,7,8,8,9,9,10,10,10-heptadecafluoro-1-decene.

3. A composition of claim 1 wherein said fluoroelastomer consists essentially of copolymerized units of 30 to 70 mole percent tetrafluoroethylene, 5–25 mole percent vinylidene fluoride, 15–55 mole percent propylene, and 0.05–4 mole percent of a fluoroolefin, said fluoroolefin being selected from the group consisting of 1,1,3,3,5,5,6,6,7,7,8,8,8-tridecafluoro-1-octene; 1,1,3,3,5,5,6,6,6-nonafluoro-1-hexene; and 1,1,3,3,5,5,6,6,7,7,8,8,9,9,10,10,10-heptadecafluoro-1-decene.

4. A composition of claim 1 wherein said fluoroelastomer consists essentially of copolymerized units of 10 to 40 mole percent ethylene, 2 to 60 mole percent tetrafluoroethylene, 20 to 45 mole percent perfluoro(methyl vinyl ether), and 0.05–4 mole percent of a fluoroolefin, said fluoroolefin being selected from the group consisting of 1,1,3,3,5,5,6,6,7,7,8,8-tridecafluoro-1-octene; 1,1,3,3,5,5,6,6,6-nonafluoro-1-hexene; and 1,1,3,3,5,5,6,6,7,7,8,8,9,9,10,10,10-heptadecafluoro-1-decene.

5. A composition of claim 1 wherein said polyhydroxy crosslinking agent is a crosslinking agent selected from the group consisting of
i) dihydroxy-, trihydroxy-, and tetrahydroxy-benzenes, -naphthalenes, and -anthracenes;
ii) bisphenols of the formula:

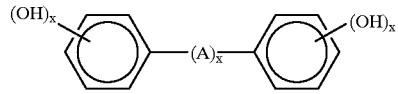

where A is a stable divalent radical; x is 0 or 1; and n is 1 or 2;
iii) dialkali salts of said bisphenols,
iv) quaternary ammonium and phosphonium salts of said bisphenols,
v) tertiary sulfonium salts of said bisphenols, and
vi) esters of said bisphenols.

6. A curable composition of claim 1 wherein said cure accelerator is chosen from the group consisting of quaternary ammonium salts, tertiary sulfonium salts and quaternary phosphonium salts.

7. A curable composition of claim 6 wherein said cure accelerator is selected from the group consisting of
i) quaternary ammonium salts of said polyhydroxy crosslinking agent (B),
ii) quaternary phosphonium salts of said polyhydroxy crosslinking agent (B) and
iii) tertiary sulfonium salts of said polyhydroxy crosslinking agent (B).

* * * * *